US007006801B2

(12) United States Patent
Lang

(10) Patent No.: US 7,006,801 B2
(45) Date of Patent: Feb. 28, 2006

(54) RETRACTABLE MULTIBAND RADIATOR WITH SWITCHING CONTACT FOR WIRELESS COMMUNICATION DEVICES

(75) Inventor: Christopher C. Lang, Vernon Hills, IL (US)

(73) Assignee: Amphenol-T & M Antennas, Vernon Hills, IL (US)

( * ) Notice: Subject to any disclaimer, the term of this patent is extended or adjusted under 35 U.S.C. 154(b) by 933 days.

(21) Appl. No.: 09/907,389

(22) Filed: Jul. 17, 2001

(65) Prior Publication Data

US 2001/0041544 A1 Nov. 15, 2001

Related U.S. Application Data

(62) Division of application No. 09/303,937, filed on May 3, 1999.

(51) Int. Cl.
*H04B 1/38* (2006.01)
*H04M 1/00* (2006.01)

(52) U.S. Cl. .................. 455/90.3; 455/562.1; 343/702; 343/895; 343/906

(58) Field of Classification Search ................. 343/702, 343/895, 906; 455/73, 82, 83, 90, 562
See application file for complete search history.

(56) References Cited

U.S. PATENT DOCUMENTS 4,868,576 A 9/1989 Johnson, Jr. ................ 343/702
5,204,687 A 4/1993 Elliott et al. ................ 343/702
5,446,469 A 8/1995 Makino ...................... 343/702
5,479,178 A 12/1995 Ha ............................ 343/702
5,594,457 A 1/1997 Wingo ........................ 343/702
5,717,408 A 2/1998 Sullivan et al. ............ 343/702
5,771,023 A 6/1998 Engblom .................... 343/702
5,825,330 A 10/1998 Na et al. .................... 343/702
5,859,617 A 1/1999 Fujikawa .................... 343/702
5,969,684 A 10/1999 Oh et al. .................... 343/702
6,052,089 A 4/2000 Eggleston ................... 343/702
6,107,966 A 8/2000 Fahlberg ..................... 343/702

*Primary Examiner*—Jack Chiang
*Assistant Examiner*—Quynh H. Nguyen
(74) *Attorney, Agent, or Firm*—Greer, Burns & Crain, Ltd.

(57) ABSTRACT

A retractable antenna for a wireless communicator includes an elongate radiator that slides through a helical radiator. An electrical contact alternately contacts one of the elongate radiator and the helical radiator depending on a position of the elongate radiator relative to the helical radiator. Mechanical disengagement is accomplished by the movement of the elongate radiator into a contact position with the electrical contact to disengage the helical conductor. A preferred feature of the antenna is that one of the helical radiator and elongate radiator make electrical contact with the wireless communicator circuits, even when the antenna is placed between a fully refracted and fully extended position. Multiple band operation is another feature of the retractable antenna due to its periodic nature. Ease of assembly is achieved through preferred individual snap fit components.

3 Claims, 2 Drawing Sheets

RETRACTABLE MULTIBAND RADIATOR WITH SWITCHING CONTACT FOR WIRELESS COMMUNICATION DEVICES

This is a divisional, of application Ser. No. 09/303,937, filed May 3, 1999.

FIELD OF THE INVENTION

The present invention generally concerns antennas for a wireless communication device. More specifically, the present invention concerns antennas which are unique in that they operate effectively in both an extended and retracted position. The antenna design is diverse due to its ability to operate in multiple frequency bands and continue to function in partially extended positions.

BACKGROUND OF THE INVENTION

New generation portable communicators, particularly wireless phones, operate in multiple frequency bands. Portable phones used in wireless applications that function in multiple frequency bands typically require more than one antenna to allow use in both bands, e.g. the cellular and digital frequency bands. Additional costs are incurred in a phone using multiple antennas. They include additional component costs, added assembly procedures requiring labor intensive operations, rejection ratio increase due to manufacturing issues such as crimping/soldering repeatability, and reliability concerns involving the complexity of the electrical connection of the two separate antennas.

SUMMARY OF THE INVENTION

Wireless phones that use antennas that are retractable alleviate this problem. They function in two modes of operation. In the retracted position, the phone is in standby, ready to receive a call and still convenient for the user to store and transport. After a call is made or received the antenna can be extended, and known as the enhanced mode of operation. With the antenna in the fully extended position, optimal reception is achieved allowing fringe area coverage. Also, from the standpoint of the safety, coupling to the user's head is greatly decreased resulting in better phone performance with the added benefit of reducing the absorption of RF energy by the user.

The retractable antenna's functionality, when designed properly, is greatly improved if it has the ability to operate in two separate frequencies bands. This is important for a user that must travel extensively for business reasons. Because both cellular and digital systems are used across the country, only one wireless phone would be necessary to accommodate any situation encountered when traveling.

Such needs are met or exceeded by the present dual radiator antenna. The present antenna is in continuous contact with the phone circuits in both the extended, partially extended, and retracted positions and operates in two frequency bands simultaneously. Ease of assembly is a natural by-product of the antenna of the invention which lends itself to efficiency in the production and reliability of the product.

More specifically, a preferred embodiment of the present antenna includes both a helical and elongate radiator. The helical radiator is held between a core and a sheath. The core snap fits to an inside surface of the sheath. A conductive ferrule secures at an end of the sheath to make an electrical contact between the helical and the elongate radiators of the antenna/wireless communicator interface. A pusher element is disposed on the elongate radiator from the ferrule when the elongate is located in the first position (extended). The bumper is slid to move in a space between the core and the ferrule. Being held between the core and the sheath, the helical radiator extends at least partially into the space between the ferrule and the core to electrically contact the ferrule when not compressed by the pusher (extended partially or fully).

The switching contact multiple band antenna functions in both the retracted (standby) or extended (enhanced) modes at two different frequency bands simultaneously. In the retracted position, the helical radiator radiates in both the cellular and digital frequency bands. In the cellular band, the helical radiator is approximately λ/4 and presents a 50 ohm impedance to antenna input of the phone, while in the digital frequency band the coil is λ/2 with an impedance of about 600 ohms and is matched to the phone's antenna input impedance via conventional matching techniques. This phenomena is also exhibited in the extended position with only the elongate radiator radiating.

BRIEF DESCRIPTION OF THE DRAWINGS

Other features and advantages of the invention will be apparent to those skilled in the art with reference to the detailed description and the drawings, of which.

DETAILED DESCRIPTION OF THE INVENTION

Figure 1:
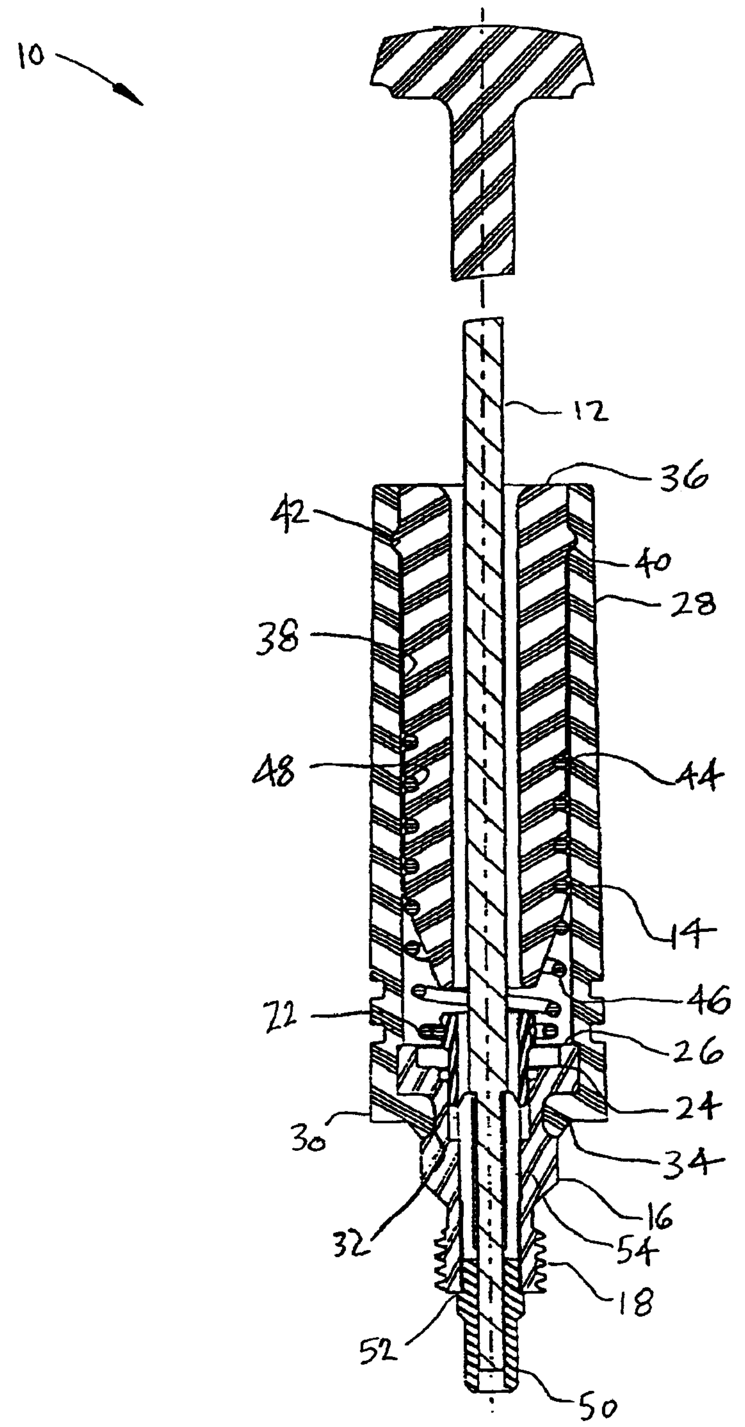
FIG. 1 is a cross-sectional view of a fully assembled preferred antenna with a elongate radiator located in a fully extended position according to the present invention.

Turning now to the drawings, and particularly FIG. 1, a retractable antenna indicated generally as 10 is shown for a portable communicator such as a cell phone. An elongate radiator 12 of the antenna moves by sliding through a helical radiator 14 to alternately make electrical contact to a conductive ferrule 16. In particular, the ferrule 16 alternately contacts either the elongate radiator 12 or the helical radiator 14 depending on a position of the elongate radiator 12 relative to the helical radiator 14. At the cellular frequency band the helical radiator 14 is active as a λ/4 length radiator when the elongate radiator 12 is retracted (partially or fully). When the elongate radiator 12 is fully extended it is active and acts as a λ/4 radiator in the cellular frequency band. In the case oil the digital band, either radiator may as a λ/2 radiator when activated. This gives the engineer impedance flexibility and allows single or multiple band design. It should be noted that multiple band antennas require additional matching components in the form of discrete components.

In addition to making electrical contact to the radiators (12, 14), the ferrule 16 couples to a cell phone or other device through threads 18 to electrically and mechanically connect the antenna with phone circuits. Engineers will appreciate that the mechanical mounting of the ferrule to the phone may be modified so long as radiators of the antenna are able to alternately make electrical contact with the ferrule 16.

The present invention also includes a bumper 20 responsive to movement of the elongate radiator 12 into a contact position with the ferrule 16, to disengage the helical conductor 14. A bottommost turn 22 of the helical radiator 14 securably snap fits into the bumper 20 which must be produced of a non conductive material in embodiments like the one shown in FIGS. 1 and 2. This helps prevent jamming because the non conductive bumper 20 is always partially connected by the ferrule 16. However, in alternate embodiments the bumper 20 may be produced from conductive material. Also, a snap fit is desirable, but not necessary, since the bumper 20 need only be capable to engage and compress the helical radiator 14.

A diameter of the helical radiator 14 preferably tapers toward the ferrule 16 so that the bottommost turn 22 fits by sliding into a corresponding recess 24 of the ferrule 16 to make electrical contact with the ferrule. The taper allows the helical radiator 14 to fit within the recess 24 of the ferrule 16 and to expand while the helical radiator 14 is under a compressive force. It is also contemplated, however, that a top edge 26 of the ferrule 16 does not contain a recess 24 and the helical radiator 14 electrically contacts the top edge 26 of the ferrule 16.

Attached to the ferrule 16 is a hollow sheath 28 which mechanically connects to the ferrule 16. As shown, the ferrule 16 connects near a bottom end 30 of the sheath 28. To connect the sheath 28 to the ferrule 16, it is preferred that the ferrule 16 snap fits into the sheath 28, but alternately the sheath 28 may be injection molded onto the ferrule 16. To accommodate snap fitting, the ferrule 16 includes at least one detent 32 that corresponds to at least one projection 34 on the sheath 28. Engineers will appreciate, however, that the ferrule 16 could include a projection and the sheath 28 could include a corresponding detent. Snap fitting is a preferred method of connecting components of the present invention since such an operation reduces the cost and difficulty in assembling the pieces.

Snap fit assembly is also preferably utilized to secure a core 36 to an inside surface 38 of the sheath 28. To accommodate assembly, the core includes at least one projection 40 that corresponds to at least one detent 42 in the sheath 28. It can be appreciated, however, that the sheath can include the projection and the core can include the detent. At least an upper portion 44 of the helical radiator 14 is held between the core 36 and the sheath 28, and a lower portion 46 extends into a space between the core 36 and the ferrule 16 to electrically contact the ferrule 16. Preferably, to hold the upper portion 44 of the helical radiator 14 in place, an outer surface of the core 36 includes threads 48 that accommodate the upper portion 44 of the helical radiator 14. Moreover, the lower portion 46 of the helical radiator 14 is free from the core 36 to allow compression of the lower portion 46 of the helical radiator 14 when the bumper 20 moves away from the ferrule 16.

Also included in the core 36 is the elongate radiator 12 which is positioned to slide through the core 36 and the ferrule 16 and electrically contact the ferrule 16 when, for example, located in a fully extended position as displayed in FIG. 1. To electrically contact the ferrule 16, the elongate radiator 12 includes a contact element 50. The contact element 50 includes a lip 52 to stop the extension of the elongate radiator 12 when the lip 52 abuts the ferrule 16. Located above the contact element 50 is a pusher 54 (best shown in FIG. 2) to displace the bumper 20 and disengage the helical radiator 14 from electrical contact with the ferrule 16 when the elongate radiator 12 is moved into the fully extended position. The pusher 54 is sized to fit through the ferrule 16 and tapered at its top to avoid mechanically jamming when the elongate radiator 12 is moved to the fully extended position.

Figure 2:
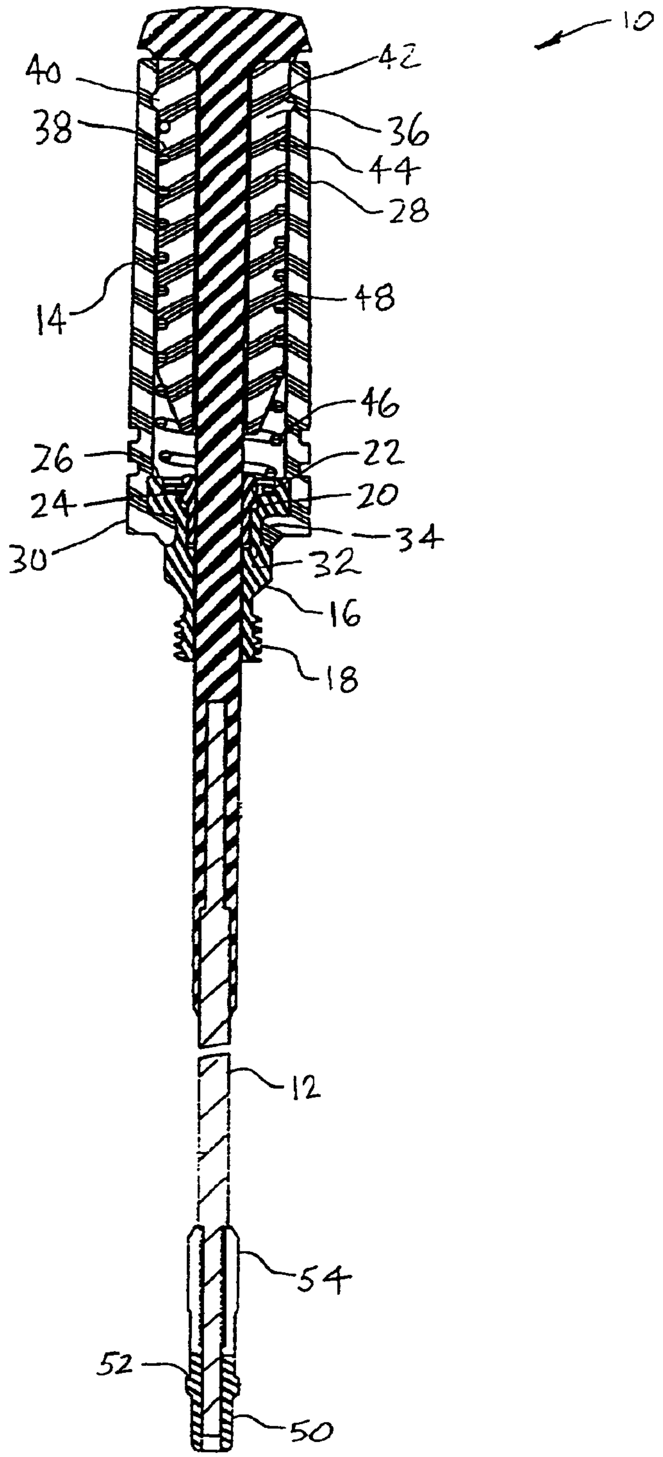
FIG. 2 is a cross-sectional view of the FIG. 1 antenna with the elongate radiator located in a fully retracted position according to the present invention.

Referring now to FIG. 2, the elongate radiator 12 is shown in a fully retracted position. Since the helical radiator 14 is under a compression force when pushed away from the ferrule 16, the helical radiator 14 expands to engage the ferrule 16 and resume electrical contact with the ferrule 16 as soon as the elongate radiator 12 disengages therefrom. When the elongate radiator 12 disengages from the ferrule 16, the pusher 54 moves away from the bumper 20 and the compressed helical radiator 14 expands to push the bumper 20 towards the ferrule 16. As the bumper 20 sits in the ferrule 16, the bottommost turn 22 electrically contacts the ferrule 16 to make contact with the ferrule 16 immediately as the elongate radiator 12 begins to retract and disengage from electrical contact with the ferrule 16. Preferably, the helical radiator is still slightly compressed when reaching the ferrule 16, so the spring force exerted on the ferrule 16 assures good electrical contact.

From the foregoing description, it should be understood that an improved antenna has been shown and described which has many desirable attributes and advantages. The antenna is adapted to make electrical contact with phone circuits while in a fully retracted position, a fully extended position, and positions therebetween. Additionally, components of the antenna are snap fit together to reduce a cost of manufacturing and increase ease of assembly.

Other alterations and modifications will be apparent to those skilled in the art. Accordingly, the scope of the invention is not limited to the specific embodiments used to illustrate the principles of the invention. Instead, the scope of the invention is properly determined by reference to the appended claims and any legal equivalents thereof.

What is claimed is:

1. A retractable antenna for a portable communicator, the antenna comprising:

an elongate radiator slidably movable through a helical radiator;

an electrical contact alternately directly contacting one of said elongate radiator and said helical radiator depending on a position of said elongate radiator relative to said helical radiator; and a disengager responsive to movement of said elongate radiator into a contact position with said electrical contact to move said helical conductor away from said electrical contact.

2. A retractable antenna for a portable communicator, the retractable antenna comprising:

an elongate radiator slidably movable through a helical radiator;

an electrical contact alternately contacting one of said elongate radiator and said helical radiator depending on a position of said elongate radiator relative to said helical radiator;

a disengager responsive to movement of said elongate radiator into a contact position with said electrical contact to disengage said helical conductor, and wherein said helical radiator is under a compression force when disengaged from said electrical contact.

3. The antenna according to claim 1, wherein said helical radiator engages said electrical contact as soon as said elongate radiator disengages from said contact position.

* * * * *